United States Patent
Shaheen et al.

(10) Patent No.: US 8,780,386 B2
(45) Date of Patent: Jul. 15, 2014

(54) SYSTEMS AND METHODS FOR ENABLING AND IMPLEMENTING REAL-TIME FACSIMILE OVER INTERNET PROTOCOL

(75) Inventors: John George Shaheen, Attleboro, MA (US); Maciej Wasiel, Newton, MA (US); Robert John Moran, Acton, MA (US)

(73) Assignee: Dialogic Corporation, Montreal (CA)

(*) Notice: Subject to any disclaimer, the term of this patent is extended or adjusted under 35 U.S.C. 154(b) by 662 days.

(21) Appl. No.: 12/781,405

(22) Filed: May 17, 2010

(65) Prior Publication Data
US 2010/0296121 A1    Nov. 25, 2010

Related U.S. Application Data

(60) Provisional application No. 61/079,482, filed on May 19, 2009.

(51) Int. Cl.
*G06F 3/12* (2006.01)
*H04N 1/00* (2006.01)
*H04N 1/32* (2006.01)

(52) U.S. Cl.
USPC .......... 358/1.15; 358/1.13; 358/401; 358/442

(58) Field of Classification Search
None
See application file for complete search history.

(56) References Cited

U.S. PATENT DOCUMENTS

| 7,639,383 | B2 | 12/2009 | Oliszewski et al. | |
|---|---|---|---|---|
| 2003/0037115 | A1* | 2/2003 | Tomita et al. | 709/206 |
| 2005/0004991 | A1* | 1/2005 | Yokoyama | 709/206 |
| 2006/0026247 | A1* | 2/2006 | Shobu | 709/206 |
| 2006/0031472 | A1* | 2/2006 | Rajavelu et al. | 709/224 |
| 2008/0151318 | A1* | 6/2008 | Shobu | 358/403 |
| 2008/0285554 | A1* | 11/2008 | Noguchi | 370/389 |
| 2010/0128323 | A1 | 5/2010 | Oliszewski et al. | |
| 2011/0170124 | A1* | 7/2011 | Fujioka | 358/1.9 |

* cited by examiner

*Primary Examiner* — Thierry L Pham
(74) *Attorney, Agent, or Firm* — Chapin IP Law, LLC

(57) ABSTRACT

Systems and methods are provided for real-time communication (e.g., fax, voice, video) via an IP Network even if a firewall or other restriction element is present or encountered. The real-time nature of the communication is ensured by preestablishing a communication session between a transfer client and a transfer server, between which the firewall or other restriction element is located. Following the preestablishment of the communication session, transmission control messages are exchanged between the transfer server and the transfer client via the preestablished communication session. The preestablished communication session prevents the firewall or other restriction element from blocking or delaying traffic (e.g., fax, voice, video traffic). The preestablished communication session establishes a full duplex communication link without restriction of or by the firewall or other communication restriction element. Accordingly, the firewall or restriction element considers traffic originating from outside of the portion of the IP network where the firewall is located to be in response to a request from the inside the IP Network. Thus, the firewall or restriction element will not act to block or delay the traffic from entry.

9 Claims, 4 Drawing Sheets

SYSTEMS AND METHODS FOR ENABLING AND IMPLEMENTING REAL-TIME FACSIMILE OVER INTERNET PROTOCOL

CROSS REFERENCE TO RELATED APPLICATIONS

This application claims priority from and incorporates by reference the entirety of U.S. Provisional Patent Application Ser. No. 61/179,482, which was filed on May 19, 2009.

STATEMENT REGARDING FEDERALLY SPONSORED RESEARCH OR DEVELOPMENT

N/A

BACKGROUND OF THE INVENTION

Fax (short for "facsimile") refers to technology for transferring documents, files or images over a communications network. Although fax technology dates back to the 1800's and its underlying principles today remain similar to those from long ago, fax only gained widespread popularity and global market penetration in recent decades with the modernization of communications equipment and networks. Such improvements allowed fax technology to develop and expand to an extent that "fax machines" became ubiquitous devices used by millions to routinely transmit documents, files or images quickly, easily and reliably anywhere in the world and in turn led to widespread acceptance of and reliance upon fax technology by both the private and public sectors as a viable—and in most cases preferred—alternative to the more time consuming and expensive process of sending documents via postal mail. These and other factors caused fax technology to become an extremely important and lucrative worldwide industry.

With the more recent surge in popularity of electronic mail ("email"), however, there were concerns as to whether fax technology would continue to be relevant, let alone profitable. These fears have proven to be unfounded, as fax continues to flourish and is predicted to remain a telecommunications fixture for many years to come. Fax technology, may adapt, however, to be implemented with new techniques as new technology becomes available. Most notably, as fax technology became widespread, faxes were being transmitted on or via the Public Switched Telephone Network (PSTN). And although the PSTN is still by far the most widespread telephone network used for fax worldwide and is poised to remain as such for years to come, there has been increasing interest in and usage of Internet Protocol (IP) based networks for fax, particularly in the last several years.

There is little doubt that IP-based networks hold exciting promise in terms of what they may provide in addition to or above and beyond PSTN networks. However, as many have already observed, migration from the PSTN to IP-based networks likely will not be entirely seamless, requiring changes and/or adjustments in order to enable legacy PSTN technology, such as fax, to be used in the same or different ways on IP networks.

To date, those who send faxes over IP networks do so by utilizing a call control protocol (e.g., SIP or H.323) to negotiate into faxing modes between gateways located on both ends (sending/receiving) of a fax transmission. The fax is transmitted as an audio stream (via RTP) or as a fax session (via T.38, a T.30-based network wrapper) over the IP network; in both cases, the negotiations of these transport layers use non-standard IP ports within the so-called "Dynamic" (as opposed to so-called "Well Known" or "Registered") IP port ranges. Problems arise, for example, due to interactions between different networks with different network security rules, which can prevent the usage of these media communication ports and, in turn, block the establishment of these fax media sessions. One could attempt to obviate these problems to enable real-time fax by opening all of the more than 15000 Dynamic ports. However, making these ports available is not a practical solution, since the relevant portion of the IP Network would be vulnerable to security breaches and/or malicious attacks and content. In other words, although real-time fax transmission is possible on IP networks as presently architected, it would bring with it very real risks that would outweigh the benefits it would provide.

Various "store and forward" systems have been deployed in an attempt to work around Fax over IP (FoIP) network issues and that would not result in vulnerability to these types of security issues. However, such systems are unable to provide real-time fax functionality, since they buffer fax documents and retransmit them on behalf of users at a later time, thus employing two or more call legs and failing to provide real-time notification to originating fax devices as to whether the fax sessions were successful or not. This non-real-time fax facility presents a number of problems, including the inability to meet requirements established for traditional fax devices or various worldwide industry, compliance and/or governmental mandates.

Therefore, a need exists for technology that allows for real-time facsimile (or other non-fax communications) to occur via IP-based networks to fully utilize the benefits of such IP-based networks, yet while also not leaving IP Networks vulnerable to security issues and while at least preserving, if not improving upon, the overall experience of existing technology and conventional methodology.

BRIEF SUMMARY OF THE INVENTION

These and other needs are met by systems and methods of the present disclosure, such systems and methods providing for real-time communication (e.g., fax, voice, video) via a packet switched network, such as an IP Network, for example, even if a firewall or other restriction element is present or encountered. The real-time nature of the communication is ensured by preestablishing a communication session between a transfer client and a transfer server, between which the firewall or other restriction element is located. Following the preestablishment of the communication session, transmission control messages are exchanged between the transfer server and the transfer client via the preestablished communication session. The preestablished communication session prevents the firewall or other restriction element from blocking or delaying traffic (e.g., fax, voice, video traffic). The preestablished communication session establishes a full duplex communication link without restriction of or by the firewall or other communication restriction element. Accordingly, the firewall or restriction element considers traffic originating from outside of the portion of the IP network where the firewall is located to be in response to a request from the inside the IP Network. Thus, the firewall or restriction element will not act to block or delay the traffic from entry.

Also in accordance with the systems and methods of the present disclosure, IP ports that are used to open the preestablished communication session can be any IP ports within the "Well Known Ports" or "Registered Ports" or "Dynamic" ports, and need not be (but can be) preselected. Moreover, such systems and methods can be employed whereby steps are taken to determine and implement optimal (or at least preferred) transmission sessions such that, for example, the device that will receive the transmission can be changed on the fly, during the transmission, for example, or otherwise modified/relocated.

DETAILED DESCRIPTION OF THE INVENTION

This application incorporates by reference the entirety of U.S. Provisional Patent Application Ser. No. 61/179,482, which was filed on May 19, 2009.

Systems and methods are provided to enable faxes (i.e., facsimile-based communications/messages) to be transmitted entirely or in part on or via a packet switched network, such as an IP network, and in real-time, even if a firewall or other restriction element is encountered. In addition, such systems and methods enable faxes to be transmitted (i.e., sent and/or received) without causing or facilitating security vulnerabilities that may be present with a real-time transmission via a packet switched network. As used herein with respect to fax transmissions, the phrase "real-time" refers to the real-time nature of the T.30 fax protocol, as defined in ITU document F.185 section 3.1.1 ("Real-time session oriented Internet facsimile ("real-time")).

Figure 1:
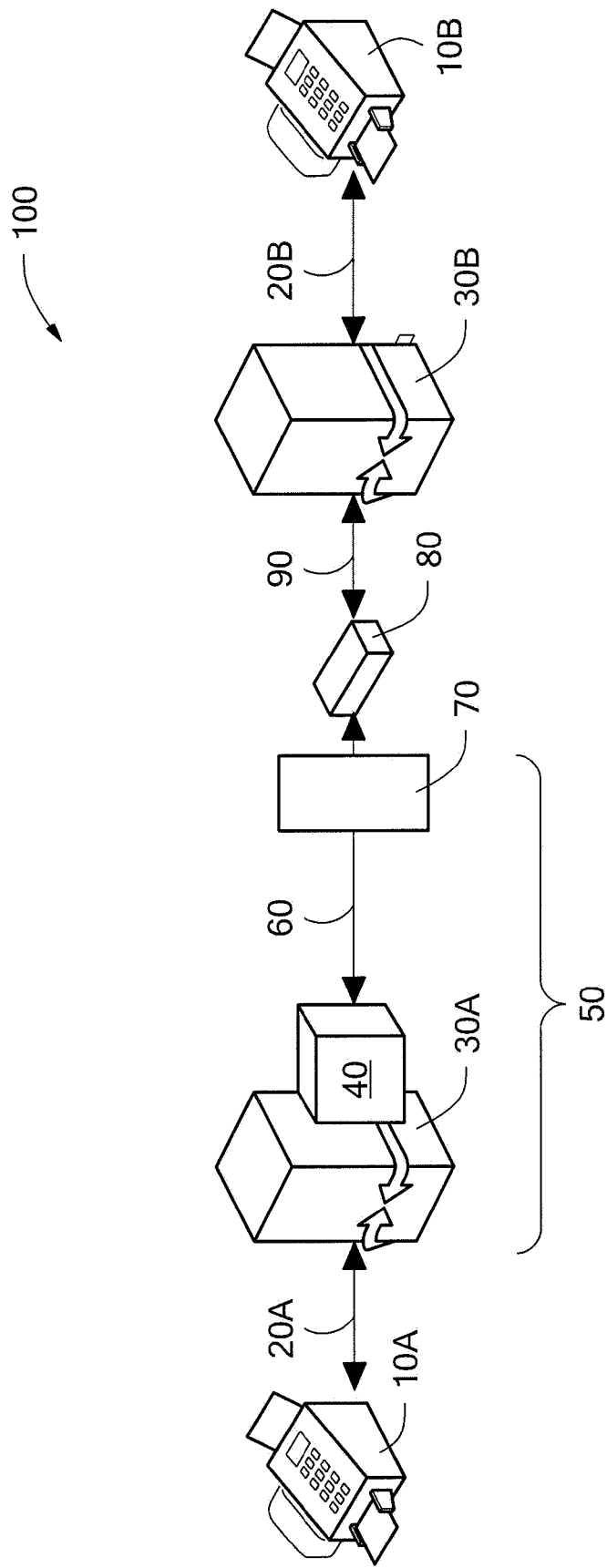
FIG. 1 is a schematic view of an exemplary system of the present disclosure for enabling real-time facsimile over a packet switched network.

FIG. 1 depicts an exemplary fax system 100 that enables faxes to be sent, in real-time, from a fax device 10A to another fax device 10B, wherein the device 10A, 10B are generally, but not necessarily located remotely from each other, such as on separate premises. The system 100 is further depicted and described as implemented within a carrier network 110 in FIG. 1A, and in a message flow context in FIG. 2. The carrier network 110 can be implemented as a value-add network that provides additional services to customers of the carrier that are valuable to the customers' business, for example.

Figure 1A:
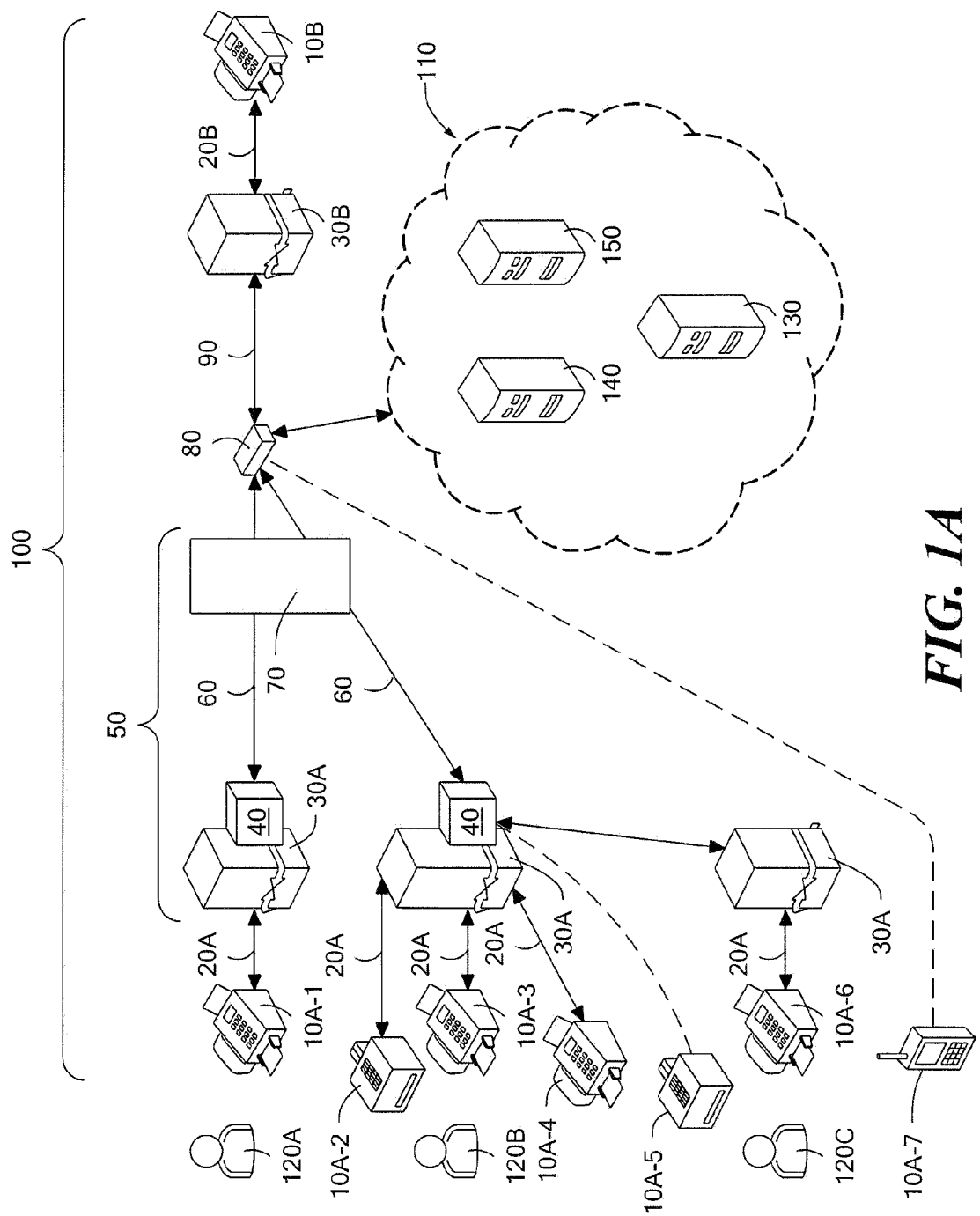
FIG. 1A is a schematic view of an exemplary network in which the exemplary system of FIG. 1 has been implemented.
Figure 2:
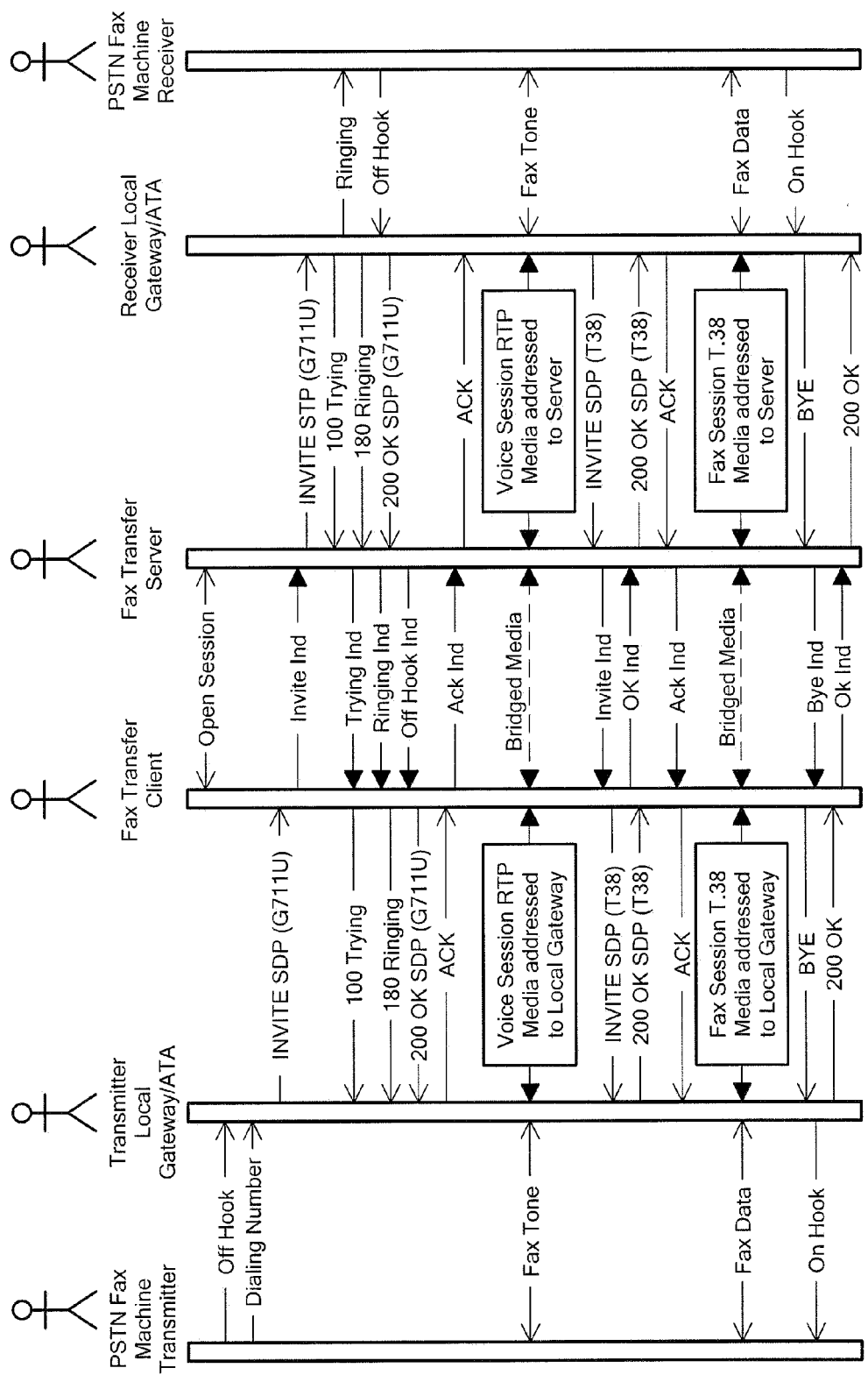
FIG. 2 is a message flow diagram depicting the operation of the exemplary system of FIG. 1.

For purposes of discussing the system 100, it is assumed that faxes are being sent from the fax device 10A to the fax device 10B; however, it should be noted that the depicted system 100 can likewise function to send faxes from the fax device 10B to the fax device 10A. It is also understood that the fax device 10A and/or the fax device 10B can actually represent multiple fax devices, as shown in FIG. 1A and as can be the case, for example, where the system is part of a local area network associated with a corporate entity and/or employees of the corporate entity. Moreover, it is understood that the depicted fax devices 10A/10B in FIG. 1, although visually resembling traditional fax machines, can be any device, machine, peripheral, equipment or object, single or multiple, wired or wireless, that is capable of sending and/or receiving a fax, such devices including but not being limited to stand alone and other fax machines, computers/PCs, tablet devices, multi-function peripherals (MFPs) and mobile devices, some of such other devices being shown in FIG. 1A.

Each of the fax device(s) 10A, 10B is directly or indirectly connected to or otherwise has access to a circuit switched network, such as the Public Switched Telephone Network (PSTN). In the FIG. 1 system 100, reference numeral 20A represents the PSTN connection for the fax device(s) 10A and reference numeral 20B represents the PSTN connection for the fax device(s) 10B. It is noted that unless otherwise specified, the term "connect" and other forms thereof (e.g., "connection") as used herein, represent either or both a direct connection or an indirect connection.

In accordance with the system 100, a fax sent via or from the fax device 10A via the PSTN connection 20A encounters a first intermediary device 30A, such as a gateway or an analog telephone adapter (ATA), which connects the PSTN to a fax transfer client 40. The fax transfer client 40 may be software that is contained within or otherwise part of or built into the first intermediary device 30A. Alternatively, or in addition, fax transfer client 40 may be client software that is running on a device or appliance (not shown), such as a computer or an additional ATA or gateway, that is located within the IP network area 50. Area 50 represents a portion of a localized security area, i.e., a demilitarized zone (DMZ), of the IP network that is within or accessible by the premises at which the fax device(s) 10A is/are located. As shown in FIG. 1, it is also generally (but not necessarily) the case that the first intermediary device 30A is located within the first premises IP Network area 50.

Connection 60 represents a connection session, such as a TCP session, from the fax transfer client 40 to a fax transfer server 80 that is located on a public portion (i.e., not restricted to the first premises) of the IP Network. Optionally, and as shown in FIG. 1, a firewall 70 (e.g., a control or communication restriction element or Session Border Controller) can be located between the fax transfer client 40 and the fax transfer server 80. If the firewall 70 is present as part of the system 100, and depending on the configuration and characteristics of the firewall 70 acting as a communication restriction element, for example, the fax transfer client 40 can send "keep-alive" messages to the fax transfer server 80 on a periodic yet at least somewhat regular basis (e.g., every 60 minutes, but depending again on the restriction element characteristics). Such keep-alive messages cause the connection 60 and any other communication sessions to be maintained and/or not dropped by the firewall 70 while the fax transfer client 40 awaits an incoming fax that is to be sent from a fax device 10A. As described in further detail below, the presence of the firewall 70, if configured as is generally known in the art (e.g., to provide network security to the first premises portion of the IP Network area 50), would, in a conventional fax transmission system, inherently cause a fax transmission sent from a fax device 10A not to satisfy the requirements of the T.30 "real-time" fax protocol.

At a second premises, there is located, in addition to at least one fax device 10B, a second intermediary device 30B (which, like the first intermediary device 30A, also can be a gateway or ATA) as well as a PSTN connection 20B. Connection 90 serves as a connection, which may be, for example, an IP connection, between the fax transfer server 80 and the second intermediary device 30B. It is noted that the second intermediary device 30B also can be an Internet Aware Fax (IAF) device or an IP-based fax server, in which case the second intermediary device 30B can itself function as a fax device and can operate with or in place of the one or more of the fax devices 10B. Such an alternate or additional arrangement, with the fax devices 10A and/or 10B being optional or not present, can be implemented at any or all of the premises where the fax device(s) normally is/are located and that are served by the system 100.

In accordance with an exemplary implementation of the system 100, the fax transfer client 40 can create a session (via connection 60) to the fax transfer server 80 to permit a fax to be sent from a fax device 10A to a fax device 10B. Assuming, for purposes of this exemplary embodiment, that the firewall 70 is present, and depending on the specific configuration of the firewall 70, this created session can use IP ports (not shown) to open/establish a communication session between the fax transfer client 40 and the fax transfer server 80. The use of such IP ports can help ensure that the real-time nature of the T.30 fax protocol is preserved because a full duplex communication link is established without restriction of or by the firewall 70. The opened/established session permits the firewall 70 to consider the traffic originating from outside of the first premises IP Network area 50 to be a/in response to a request from the first premises IP Network area 50. Accordingly, the firewall 70 will pass (i.e., not block or delay) the traffic entering the first premises IP Network area 50. Such traffic may include communications as part of a fax transmission being sent either from the fax device 10A to the fax device 10B or from the fax device 10B to the fax device 10A.

It is noted that the transport application layer of the opened/established session can be, by way of non-limiting example, a TCP session, which may include a persistent connection to maintain the session or communication link. Also, a network security protocol (e.g., TLS or SSL) optionally may be applied to the opened/established session as well to advantageously guard against so-called network packet "snooping," in which an unintended third party is able to view data packets and, in turn, to assemble the data that is transmitted so as to gain or facilitate unauthorized access to the fax devices 10A, 10B.

Once the opened/established communication session is provided, the first premises IP network area 50 is connected to the fax transfer server 80 via connection 60 and without interference or delay caused by the firewall 70, enabling a fax to be sent from a fax device 10A to a fax device 10B in real-time During the fax transmission process, the first intermediary device 30A may provide instructions to the fax transfer client 40 to create a fax session, such instructions including information that can be used to complete the fax call placement and such instructions being processed with predetermined routing rules or by the fax transfer client 40 intercepting the traffic generated by the first intermediary device 30A.

The fax transfer client 40 contacts or notifies the fax transfer server 80 to request that a fax call be generated to the second intermediary device 30B for transmission to a fax device 10B using a feasible call control method (e.g., Session Initiation Protocol (SIP)) known to one of ordinary skill in the art. In a embodiment of the system 100 where a firewall 70 is present, or where it is desired to protect the fax transfer client 40 from direct communication with the second intermediary device 30B, messages generated in response to this request by the fax transfer server 80 generally can be proxied on behalf of the fax transfer client 40 by the fax transfer server 80.

It is noted that the fax transfer server 80 may be responsible for other optional fax transfer clients (not shown) in addition to the fax transfer client 40, wherein such other fax transfer clients do not factor directly into the sending of a fax from the fax device 10A to the fax device 10B. In such a case, although the fax transfer server 80 generally can maintain client information for each fax transfer client (i.e., the fax transfer client 40 plus some or all of the other fax transfer clients), it can generally maintain connection establishment information to the specific second intermediary device 30B that is involved in the current transmission.

Moreover, if in furtherance of the exemplary system 100 of FIG. 1, all traffic from the fax transfer client 40 passes through the fax transfer server 80, the fax transfer server 80 can function as a central point for all fax communication. This type of arrangement is beneficial because as a central access point, the fax transfer server 80 can provide desirable services such as value add services.

Value add services can be provided by (and thus beneficial to) one or more of various parties who implement or are involved in the process of implementing, using, enabling, setting up, or selling systems or access to systems such as the exemplary system 100 depicted in FIG. 1. For example, carriers (i.e., those authorized by governmental or other regulatory agencies to operate telecommunications systems) can integrate certain features or services into the exemplary system 100 to offer to their customers, whether business customers or residential customers.

Value add services can be provided, for example, by integrating the carrier's own network/equipment (and/or that of other third parties) with one or more pieces of equipment within the system 100, such as the fax transfer server 80. FIG. 1A shows the exemplary system 100 of FIG. 1 as part of a larger scale, value add network 110. Among the services such integration can enable or facilitate, including value add services, are fax redirect, secure fax retrieval, and archiving.

In accordance with or in furtherance of fax redirect services as implemented in a network such as the value add network 110, the presence and functioning of the fax transfer server 80 provides a facility that can be used to define rules that specify which one or more of the fax devices 10A will receive inbound facsimile messages, for example. One or more predetermined configurations or rules can be implemented at the fax transfer server 80 or implemented at another area or device (e.g., a remote access user configuration server 140) that is in communication with the fax transfer server 80. The one or more configurations or rules can provide fax routing to permit inbound faxes to be routed to one or more recipient fax devices 10A. In accordance with the one or more configurations or rules, the inbound faxes can be redirected to one or more recipient fax devices 10A, to which the inbound faxes were not necessarily addressed or intended for delivery. For example, the fax redirect service can route in bound faxes to other than the intended recipient or addressed devices, which may not have otherwise been the case had the fax redirect service not been in place. For example, FIG. 1A depicts a plurality of recipient fax devices 10A, any one or more of which can be specified as a recipient device in accordance with a fax redirect service. Implementation of a fax redirect service can have important benefits and added value for customers of a value add network 110, such as being able to steer fax traffic to certain fax devices 10A, 10B in general or, in particular, to prevent faxes from going to fax devices that may be, or are known to be, unattended.

In accordance with or in furtherance of a secure fax retrieval service implemented in the context of the value add network 110 of FIG. 1A, inbound faxes are held by the fax transfer server 80 on behalf of a subscriber to the service without being delivered to the fax device 10A to which the fax was sent. For the inbound faxes to be held, one or more predetermined configurations or rules can be implemented at the fax transfer server 80 or at another area or device (e.g., a remote access user configuration server 140) that is in communication with the fax transfer server 80. The one or more configurations or rules can be enabled or disabled as desired to control whether the service, such as fax retrieval, is active or not.

By way of non-limiting example, a business may have one or more employees to whom a secure fax retrieval service is made available, where, in the non-limiting context of FIG. 1A, three such employees 120 are shown. It is noted that the number of employees 120 can be greater or less than the three that are shown in FIG. 1. If the secure fax retrieval service is in place and active, faxes that are associated with such employees 120 or their respective fax device(s) 10A are held at fax transfer server 80 or elsewhere within the network 110 rather than being delivered to the intended fax device 10A. The employee 120 to whom the fax is addressed or is intended to be sent is notified (e.g., via email, SMS, phone call or the like) as to the receipt of the fax and permitted to log in to a system (not shown) so as to view the fax (e.g., as an tiff image). The employee 120 may be permitted to have the fax sent to the employee 120 via a predetermined method, such as via an email attachment, or by having the fax forwarded to a fax device 10A associated with the employee 120 or to any fax device reachable via the PSTN such as via connections 20A or 20B.

Fax retrieval services can be beneficial to a wide variety of customers of value add networks 110 like that which is shown in FIG. 1A. For example, employees can benefit who use or have access to one or more fax devices 10A associated with the customer but who are often (or always) not located at the specific site of the fax device(s) 10A, such as employees who work remotely or who frequently travel. This type of fax retrieval service, which can be viewed as a value add service, is also beneficial to customers of carriers where the customers and/or its employees utilize a shared public fax device, and prefer to maintain the security of its/their inbound faxes.

System 100 of FIG. 1 may also be used to archive fax messages that are sent or received. A fax archiving service can be useful in general, but has particular value for companies that routinely send or receive faxes to comply with data protection/retention regulations, guidelines or laws that exist in the United States and/or other countries, e.g., HIPAA, Sarbanes-Oxley. For example, retention of fax messages to show compliance can be difficult to manage when a relatively large number of faxes are sent or received. The fax archive service can help to meet the challenge of fax retention for compliance purposes.

A fax archiving service can be used in connection with the value add network of FIG. 1A, whereby one or more predetermined configurations or rules can be implemented at the fax transfer server 80 or implemented at another area or device (e.g., a remote access user configuration server 140) that is in communication with the fax transfer server 80. In accordance with the one or more configurations or rules, the fax transfer server can be configured to automatically retain archive information with regard to inbound and/or outbound faxes. The archive information can be stored, for example, in an archive area 130, which can be a server, cluster, or other known device or devices capable of archiving faxes. Subscribers are able to offload the often overburdening and stressful requirement of keeping track of subscriber inbound and/or outbound faxes using the fax archive service.

The capabilities of the value add network 110 of FIG. 1A also can incorporate applications or solutions that have been written (generally, but not necessarily, by a third party not associated with the network or its customers) that provide additional value add services without, in most cases, requiring additional equipment to be purchased for or used on the network. For example, the fax transfer server 80 can include an application programming interface (API) that allows for applications to interact with and/or provide functionality to the network 110.

Application-based value add services can be implemented on the network 110 that allow for the sending and/or receiving of faxes to be automated. For example, inbound faxes can be examined (e.g., via optical character recognition) to determine if they have certain characteristics that would be consistent with a specific type of document that should be routed to a specific fax device 10A. Such routing can take place even if the fax device 10A to which a fax is routed is different than the fax device to which the facsimile message was originally destined. As another example, value add services can be implemented to cause the first intermediary device 30A to perform functionality normally performed by a fax device 10A; for example, outbound faxes can be sent out without having to physically feed documents into the a fax device 10A.

Also, applications can provide rules, configurations or gating that apply to some or all inbound or outbound faxes sent to or from the system 100. Example implementations may be for security or approval related purposes, or, in the case of inbound faxes, to try to avoid "spam" messages from reaching recipients. Moreover, such applications can enable fax devices 10A, particularly fax devices implemented as MFPs, to better integrate with the system 100 to allow for certain services (e.g., compliance archiving) to be performed, or to facilitate such services.

The value add network 110 of FIG. 1A also can provide or preserve important business opportunities relating to billing. This function is important because as migration away from PSTN-based faxing occurs or continues, fax hosting service providers and providers of other services desire to be able to bill for such services. In accordance with a fax billing service implemented in or via the value add network 110, an application residing on the API of the fax transfer server 80 provides data to a billing server 150. The provided data can be selected with regard to criteria that is either reestablished by the application or chosen by a service provider. For example, such criteria might include, but not be limited to, billing on a per page received and/or sent basis, billing on a transmission time basis, etc.

Alternatively, or in addition, the value add network 110 also can allow a fax service entity (e.g., provider, carrier, wholesaler, reseller) to reduce costs associated with the network. For example, the value add network 110 permits reduced toll costs as well as maximized off-peak hours for appropriate fax traffic via what is referred to as "least cost routing" and/or "fax broadcasting".

Another benefit of the exemplary system, and, in particular the fax transfer server 80, is that the fax transfer server is able to validate software running on the fax transfer client 40 when the communication session connection 60 is established. The established connection 60 permits the fax transfer server 80 to have the opportunity to provide software and data validation on the fax transfer client 40 and to provide software and data revisions to the fax transfer client 40 executing software. Because the software validation can be initiated by the fax transfer server 80 to the fax transfer client 40 using the established communication 60, the benefit of software revisions can be performed from outside the IP network area 50. For example, software revisions to fax transfer client 40 can be performed without the assistance of personnel located within (or otherwise having access to) the IP network area 50.

Call control messages are generated by the second intermediary device 30B in response to the request by the fax transfer server 80 and are received by the fax transfer server 80. The second intermediary device 30B can be unaware of being connected to the fax transfer client 40 via connection 60 in this circumstance. The fax transfer server 80 can be proxied to the fax transfer client 40, and the call control messages will be exchanged between the fax transfer server 80 and the fax transfer client 40. The previously established communication session between the fax transfer client 40 and the fax transfer server 80 can prevent the presence of the firewall 70 or other communication restriction elements from restricting communications. The desired media protocol for the communication session can thus be maintained by forming a connection through which a real-time fax transmission can occur via the system 100. In accordance with the exemplary system 100 of FIG. 1, the fax transfer client 40 will be responsible for maintaining the real-time protocol requirements of T.30 to enable the real-time nature of the fax call to be preserved. Doing so can include steps (e.g., so-called T.30 "spoofing" techniques) to keep active the communication session should any issues arise (e.g., network delays or drop outs).

As noted above, the system 100 of FIG. 1 is also applicable to a scenario whereby a fax is desired to be sent from fax device(s) 10B to fax device(s) 10A. In accordance with such an embodiment, the system 100 will function similarly to how it has been described above; however, there can be adjustments to the equipment and/or the process to realize such an embodiment. For example, under such circumstances, call establishment can originate from the fax transfer server 80 to the fax transfer client 40.

The exemplary system 100 functions in contrast to conventional fax transmission systems, which do not include or incorporate a previously opened/established communication session between the fax transfer client 40 and the fax transfer server 80 as is described herein. Therefore, in connection with a conventional system, a fax session response originating from outside of the first premises IP Network area 50 will be treated by the firewall 70 as an unsolicited message, thus causing the session to be blocked or delayed, which will negate/prevent the real-time nature of the fax communication session, or which, as noted herein and below, can only achieve real-time transmission at the expense of accompanying security vulnerability to the IP Network.

Another distinguishing aspect of the FIG. 1 system 100 is that it allows for selection of the IP ports that will be used to open the communication session between the fax transfer client 40 and the fax transfer server 80. In the system 100, the fax transfer client 40 and the fax transfer server 80 include network endpoints that function as IP ports between which data is sent via the IP network as in known to one of ordinary skill in the art. Of the currently more than 65000 usable IP ports, that those in the range of 0 (zero) to 1023 are so-called "Well Known Ports", and those in the range of 1024 to 49151 are so-called "Registered Ports" and the remaining ports (currently 49152 to 65535) are so-called "Dynamic and/or Private Ports." Among these IP ports, however, there is no named/designated port for T.38 or fax usage. Therefore, in accordance with conventional fax systems seeking to achieve real-time fax transmissions, what generally occurs is that the IP port selected is one within the "Dynamic" range, i.e., one of the IP Ports from 49152 to 65535. In order to attempt to achieve real-time fax transmission under such circumstances, the firewall 70 is configured to allow for all unsolicited traffic in this entire "Dynamic" port range. Thus, a tradeoff can occur whereby if real-time fax transmission is to occur, the consequence that the private IP Network within the firewall can be vulnerable to security breaches or malicious content/attacks.

Conversely, in accordance with the system 100 of FIG. 1, it is not necessary to configure the firewall 70 to allow for all unsolicited traffic in entire "Dynamic" port range. Because there has been a previously established session between the fax transfer client 40 and the fax transfer server 80, the firewall 70 can be configured differently than in the conventional manner that allows for all unsolicited traffic in the entire "Dynamic" port range. Moreover, it is possible in accordance with the FIG. 1 system 100 to use not only any of the "Dynamic" ports in furtherance of the fax transmission/session, but also any of the IP ports within the "Well Known Ports" or "Registered Ports" ranges in addition or instead. Accordingly, specific IP ports need not be (but can be—see below) pre-selected in order for real-time fax to occur. In addition, the real-time nature of the fax transmission is possible without requiring new, expensive equipment to be purchased or installed as part of the system 100, and without necessitating special procedures to occur. In other words, the real-time fax transmission in accordance with the system 100 may occur within the same or shorter time frame as compared to a normal (i.e., non-real time) fax transmission, and in general can outwardly appear to all parties involved to be substantially similar or identical to a conventional fax transmission that occurs via IP or PSTN.

It should be noted, however, that the system 100 can support an embodiment whereby there is pre-selection of the IP ports that will be used. For example, it may be beneficial, such as for compatibility between networks or in view of the level of security desired, to select certain IP ports for use, including but not limited to port 80 (hypertext transfer protocol, i.e., http) or port 443 (hypertext transfer protocol with security, i.e., https).

Figure 3:
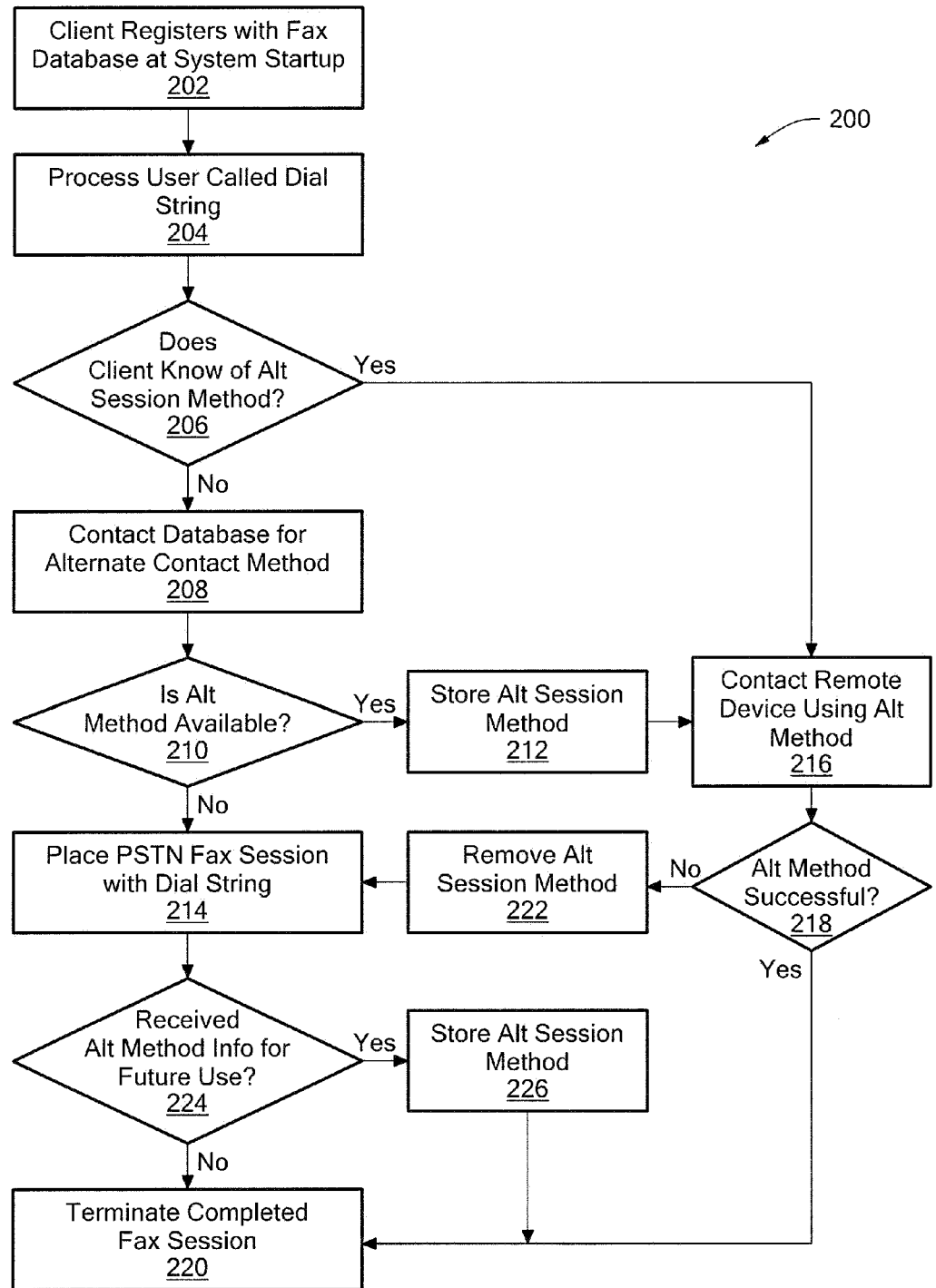
FIG. 3 is flow diagram depicting a method, applicable to the exemplary system of FIG. 1, for determining an optimal or at least preferred way to establish a real-time fax transmission session over a packet switched network.

Referring now to FIG. 3, a flow diagram 200 describes an alternative embodiment of the system 100 of FIG. 1, but still an embodiment in which real time fax transmission can occur. In accordance with this alternative embodiment, the fax transfer client 40 can determine an optimal (or at least a preferred) method to establish a real-time fax transmission session. Such a determination can have numerous benefits, among which is that the receiving fax device(s) 10B can be changed on the fly, such as during a transmission session, or modified or relocated, thus providing added flexibility to the system 100, particularly in the modern era where there is decreasing reliance on standalone fax devices.

At block 202 of the exemplary embodiment of FIG. 3, the fax transfer client 40 registers itself with a routing database (not shown), which can be co-located with the fax transfer server 80, or can be separately located. Thereafter, at block 204, the fax transfer client 40 processes the dial string provided by the sending fax device(s) 10A, after which, at decision block 206, the fax transfer client determines if it has a known or previously defined method to establish a real-time fax transmission session with the second fax device 10B. If not, then the fax transfer client 40 requests, from the routing database, an indication as to whether an alternate transmission method is available (block 208). Such a request results in a decision being made at decision block 210. If an alternate method is available, then the fax transfer client 40 stores the alternative session method and uses the method to cause the fax transmission to occur, via real-time (block 212). If no alternate method is available, however, then the fax transmission session is established with a PSTN conventional fax session (block 214).

Referring back to decision block 206, if there is a known or previously defined alternate method to establish a real-time fax transmission session with the receiving fax device(s) 10B, then the fax transmission utilizes the previously defined method (block 216) and the real-time fax transmission occurs as described above in connection with the system 100 of FIG. 1. At decision block 218, a determination is made as to whether the fax transmission is successful, i.e., that the fax transmission was completely transmitted without errors. If the transmission is deemed successful, then—at block 220—the fax session is terminated. If, however, the transmission is not considered successful, then the alternate transmission method is removed from the fax transfer client 40 (block 222) and the fax transmission session is established with a PSTN conventional fax session (block 214).

After the fax transmission session is established with a PSTN conventional fax session (block 214), whether block 214 is reached via block 210 or block 222, the second fax device 10B may or may not contact the first fax device 10A with information regarding an alternative fax transmission method (decision block 224). If such contact occurs, then the fax transfer client 40 stores the alternate fax transmission method for future reference (block 226) and the fax transmission either is completed normally (block 220), or the flow diagram 200 could be expanded at this point to reestablish the fax transmission using the alternate transmission method. If, however, such contact does not occur, then the fax transmission session is completed normally (block 220).

Although the methodology depicted in the flow diagram 200 of FIG. 3 has been described herein as being implementable in the context of the system 100 of FIG. 1, it should be noted that such methodology can be implemented, in whole or in part, in other fax-based systems, whether they are real-time systems or conventional, non-real-time systems, and/or in fax-based systems that utilize the same or different equipment than what is depicted in the FIG. 1 system. By way of non-limiting example, such other fax-based systems can include more complex networks and/or multiple party networks such as the network 110 depicted in FIG. 1A.

Moreover, it is further noted that the various systems and methods described and depicted herein also can be applicable to non-fax communications for any media-based transmission, including but not limited to voice or video transmissions that utilize IP ports in furtherance of a transmission in a client/server model setting. The described systems and methods applied to non-fax communications also allow such media-based transmissions to occur in real-time, full duplex as defined by the applicable protocol(s) for the particular medium. As with the FIG. 1 system, such transmissions are enabled because a previously established session between the client side of the client/server model (which, in the case of the FIG. 1 system 100, is the fax transfer client 40) and the server side of the client/server model (which, in the case of the FIG. 1 system 100, is the fax transfer server 80) may be utilized in the transmission of the media (e.g., voice, video) being transmitted.

The operations herein described are purely exemplary and imply no particular order. Further, the operations can be used in any sequence when appropriate and can be partially used. With the above embodiments in mind, it should be understood that the invention can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this invention. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the invention.

What is claimed is:

1. A system for use in real-time facsimile transmissions between a transmission device and a reception device over a packet switched communication network, the system implementing a client-server model and including a restriction element, the system comprising:
    a transfer client communicably connectable to the transmission device on a client side of the client-server model; and
    a transfer server communicably connectable to the reception device on a server side of the client-server model,
    wherein the restriction element is communicably connectable between the transfer client and the transfer server, thereby separating the transfer client and the transmission device on the client side of the client-server model from the transfer server and the reception device on the server side of the client-server model, and
    wherein the transfer client is operative:
        to receive a transmission from the transmission device;
        to preestablish a communication session between the transfer client and the transfer server over specified ports independent of whether the respective ports fall within a specific port range; and
        following a preestablishment of the communication session between the transfer client and the transfer server:
            to exchange transmission control message with the transfer server via the preestablished communication session; and
            to send the transmission, via the preestablished communication session through the restriction element over the specified ports, to the transfer server as a real-time transmission for receipt at the reception device.

2. The system of claim 1, wherein the specified ports for the transfer client and the transfer server are pre-selected.

3. The system of claim 1, wherein the packet switched communication network is an Internet Protocol (IP) network.

4. The system of claim 1, wherein the restriction element is a firewall.

5. The system of claim 1, wherein at least one configuration or rule is implemented at the transfer server to influence functioning of the system.

6. The system of claim 5, wherein the at least one configuration or rule is effective to enable the system to provide a value add service.

7. The system of claim 1, wherein the communication session between the transfer client and the transfer server is a Transmission Control Protocol (TCP) session.

8. The system of claim 1, wherein a network security protocol is applied to the communication session, 9. The system of claim 1, wherein the transmission device is a fax device.

* * * * *